Aug. 21, 1928.  
C. J. GILLEN  
1,681,766
ELECTRIC METER GUARD
Filed Nov. 9, 1926
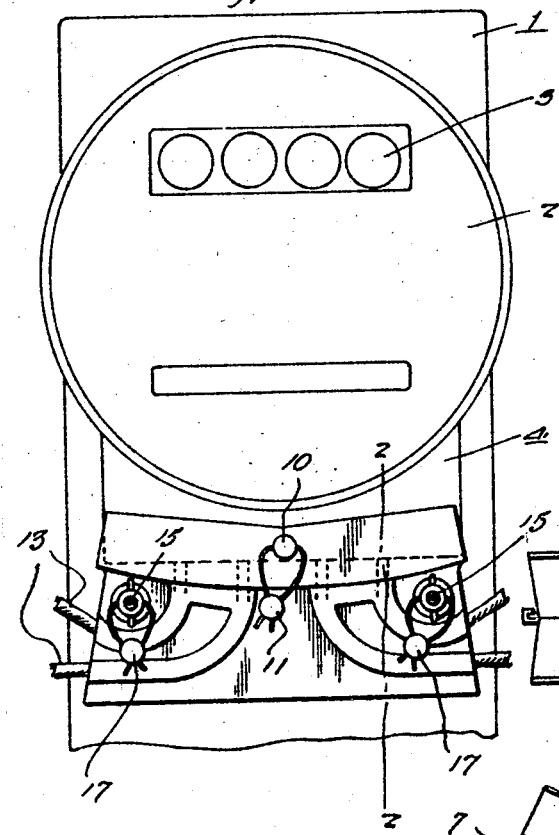
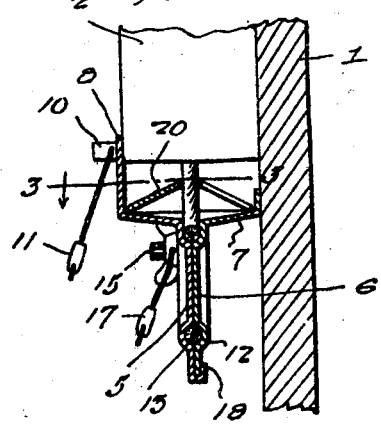
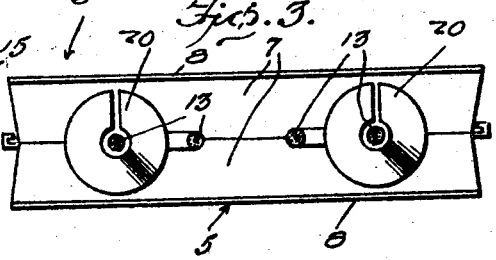
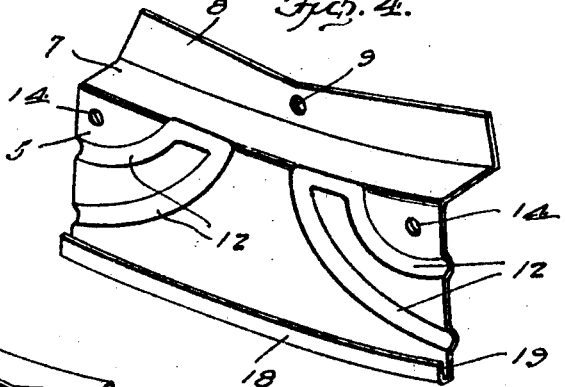
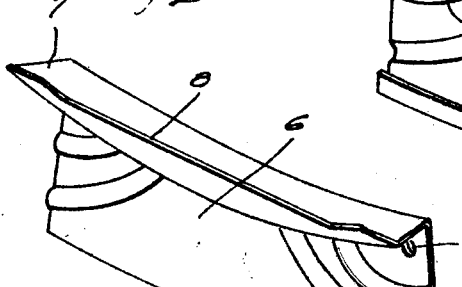
Inventor  
Chas. J. Gillen  
By *Clarence A. O'Brien*  
Attorney Patented Aug. 21, 1928.

1,681,766

UNITED STATES PATENT OFFICE.

CHARLES J. GILLEN, OF CARBONDALE, PENNSYLVANIA.

ELECTRIC-METER GUARD.

Application filed November 9, 1926. Serial No. 147,373.

This invention relates to improvements for electric meter guards in order that access to the terminals of the meter may be concealed and protected from access by unauthorized persons without striking a steel on the guard.

An object of the invention resides in providing a simple meter guard construction which may be manufactured from stamped sheet material adapted for cooperation with an electric meter and the circuit wires connected thereto for receiving suitable securing means adapted to be sealed in securing the guard in assembled relation on the circuit wires in the meter to prevent access to the terminal connections of the meter.

A further object of the invention resides in providing a meter guard construction of a substantially improved character employing a pair of substantially duplicate cooperating members formed from stamped sheet material adapted for interlocking cooperation to receive and clamp circuit connections from an electric meter therebetween, and formed to fit a portion of the meter over the terminal box thereof, in a predetermined manner so as to receive suitable sealing and securing means adapted to prevent access by unauthorized persons to the terminals of the meter and thereby preventing stealing of current from city power lines and the like.

The invention comprehends numerous other objects residing in the specific construction and relation of parts which are more particularly pointed out in the following detailed description and in the claims directed to a preferred form of the invention, it being understood however, that various changes in the size, shape and relation of the parts may be made without departing from the spirit and scope of the invention as herein set forth.

In the drawing forming part of this application:—

Figure 1 is a front elevation of an electric meter showing the improved guard construction operatively applied thereto in sealed relation.

Fig. 2 is a vertical sectional view taken on the line 2—2 of Fig. 1.

Fig. 3 is a horizontal section taken on the line 3—3 of Fig. 2, through the guard member only.

Figs. 4 and 5 show a disassembled perspective of the substantially duplicate cooperating plate members forming the guard of this invention.

This invention is adapted for application to the usual electric light meter, now in general use for measuring currents applied to consumers in houses, stores, and the like, and includes a base member 1 on which the meter 2 is mounted and which in its usual construction is provided with an indicating dial structure indicated at 3 by which the consumed current can be determined. This meter 2 is provided with a depending portion 4 housing the terminals for the wires which connect the meter to the service and the load.

It has been found from experience in the operation of these electric meters, that it is not difficult to disconnect the wires from the meter after the same is installed in a house, store, or the like, and is sealed in the usual manner to prevent tampering without indicating the same. As a result, considerable revenue is lost by electric power companies, from the stealing of current through this disconnecting of wires from the meter without destroying the seal on the meter and the using of current direct without it being registered on the meter.

In order to overcome this disadvantage of meter constructions now in use, and provide means whereby access to the connections with the meter is prevented, the guard device of this invention has been designed with a view of efficiently preventing access to the terminals of the meter with the use of a construction of relatively simple form, making it cheap to manufacture and easy to install.

This improved meter guard comprises a pair of substantially duplicate plate members 5 and 6 respectively, the member 5 forming the front plate and the member 6 the rear plate. These plate members are secured in opposed relation as illustrated in Figs. 1 to 3 and are formed at the upper sides with laterally extending arcuate flanges 7 terminating in the offset ends 8. The offset end 8 of the member 5 is formed with a central opening 9 to receive the sealing stub 10 on the housing 4 of the meter, in order that the seal 11 may be inserted through the opening in the stub for sealing the guard and housing 4 in assembled relation.

The main body of the plate members 5 and 6 is formed with pairs of arcuate grooves 12 by suitably stamping or otherwise forming the plate members which are of sheet material, to provide beaded portions thereon as clearly illustrated in Figs. 4 and 5. These grooves 12 are disposed toward the adjacent spaces of the plate members in assembled relation so that they cooperate to form passages to receive the circuit wires 13 connected with the meter. These grooves 12 open at the upper ends of the plate portions 5 and 6 and curved outwardly in opposite directions to the ends of the plate members at the opposite end portions thereof.

Openings 14 are provided in opposite end portions of the plate member to receive suitable securing bolts 15 for securing the plate members 5 and 6 in rigid assembled relation which are suitably sealed by the sealing means indicated at 17 in Fig. 1, to indicate tampering with the guard member. The lower edge portion of the plate member 5 is formed with a flange 18 extending over the adjacent portion of the plate member in spaced relation to form a groove 19 for removably receiving the lower edge of the plate member 6 which provides an interlocking connection between the plate members 5 and 6 to secure said plate members in assembled relation in addition to the securing means indicated at 15.

The flanged portion 7 extending laterally from the main body of the plate members 5 and 6 are of arcuate formation as illustrated in Fig. 1, in order to compensate for variations in the formation of grooves and the relative positions thereof with respect to the relation of the terminals in the housing 4 of the meter which varies slightly in various meter constructions, so that this guard member may be universally applied to a large number of varying types of meter structures.

Protector collars 20 illustrated in Fig. 3 are provided for removable association with the outer pair of wires to the meter at the end portions of the guard members where it fits the lower edge of the housing 4. These collars are of conical formation and constructed and attached in such a manner that contact with the wires between the guard and the meter housing 4 will be prevented due to the protecting action of the collars from instruments inserted between the guard and housing 4. These collars will deflect instruments from contact with the wires, and thereby prevent removal of the insulation with short circuiting or grounding of the currents which might permit of stealing of the current without breaking the seal and without being readily detectable upon a general inspection of the meter structure.

This guard structure for electric meters as above described, is of such a nature that the plate members 5 and 6 may be formed by use of the same die mechanism, the plate members 5 being subsequently subjected to further operation for forming the flange 18 thereon and the opening 9 for receiving the sealing stub, while the member 6 may be further operated on to remove a portion of the flange 8 so as to reduce the length of said end to correspond with the approximate proportions illustrated in Fig. 5. This operation, however, is not absolutely necessary for guards used on numerous types of meters.

From the above description it will therefore be readily appreciated that a guard construction has been provided wherein the plate members 5 and 6 may be inserted at opposite sides of the wires leading from the service and load circuits of electrical power systems adjacent the terminal housing 4 of the meter after applying the collars 20 to the outside wires, and then moved toward each other to bring the lower edge of the plate member 6 into the recess 19 within the flange 18.

The locking bolts 15 are then applied through the openings 14 and tightened in the usual manner, with the application of the ends 8 formed with the opening 9 over the sealing stub 10 so as to clamp the plate members 5 and 6, in rigid assembled relation with the wires 13 and the meter as shown in Figs. 1 and 2, following which the seals 11 and 17 are applied so that unauthorized persons are prevented from stealing current without the detection thereof.

Having thus described my invention, what I claim as new is:—

1. An electric meter guard, comprising a pair of plate members substantially counterpart of each other and formed with offset portions at one side, one of said members having the opposite side formed to project over the adjacent portion of the member in spaced parallel relation to receive the edge of the other plate member, each of said plate members being formed with wire receiving grooves in predetermined relation, and means for securing said plate members in opposed cooperating relation on an electric meter, whereby the wire connections with the meter are covered to prevent access to the meter terminals.

2. An electric meter guard, comprising a pair of sheet material plates substantially counterpart of each other and having a laterally extending flange on one side terminating in angular extension, said plates having beads formed therein to provide wire receiving channels, and means for securing said plates in opposed relation against one another with said wire receiving channels in registry to enclose electric wires, the terminals on said flanges being in spaced parallel relation and adapted for engagement with the opposite sides of a meter housing.

3. An electric meter guard, comprising a pair of sheet material plates substantially counterparts of each other, each of said plates having one side provided with a lateral extension terminating in a laterally extended end, each of said plates being formed with beads to provide wire receiving channels, one of said plates being formed at the opposite sides, with an extension lying in spaced parallel relation to the last-named side portion of the plate, and adapted to receive the other plate, and means for securing said plates with opposed sides in contact and said wire receiving grooves in registry, the terminals on said flanges being positioned in spaced parallel relation to engage at opposite sides of the meter housing.

In testimony whereof I affix my signature.

CHARLES J. GILLEN.